US012761940B2

(12) United States Patent
Khan et al.

(10) Patent No.: US 12,761,940 B2
(45) Date of Patent: Oct. 13, 2026

(54) SYSTEMS AND METHODS FOR SEAMLESS MIGRATION OF DISTRIBUTED LEDGER NODES IN A VIRTUALIZED ENVIRONMENT

(71) Applicant: Verizon Patent and Licensing Inc., Basking Ridge, NJ (US)

(72) Inventors: Ahmed A. Khan, Plano, TX (US); Mohammed Alsadi, Redmond, WA (US); Salman Ali Danish Mohammed, Wylie, TX (US); Sammy Alnajar, Plano, TX (US); Nityanand Sharma, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 541 days.

(21) Appl. No.: 18/447,599

(22) Filed: Aug. 10, 2023

(65) Prior Publication Data

US 2025/0053435 A1 Feb. 13, 2025

(51) Int. Cl.
*G06F 9/455* (2018.01)

(52) U.S. Cl.
CPC .................... *G06F 9/45558* (2013.01); *G06F 2009/45595* (2013.01)

(58) Field of Classification Search
CPC ................... G06F 9/45558; G06F 2009/45595
See application file for complete search history.

(56) References Cited

U.S. PATENT DOCUMENTS

| | | | | |
|---|---|---|---|---|
| 2018/0101396 A1* | 4/2018 | Singh | G06F 9/4401 |
| 2018/0137306 A1* | 5/2018 | Brady | G06F 9/45558 |
| 2019/0036868 A1* | 1/2019 | Chandrashekhar | H04L 45/021 |
| 2020/0379982 A1* | 12/2020 | Ozawa | G06F 16/27 |
| 2022/0121466 A1* | 4/2022 | Gasperowicz | G06F 9/455 |
| 2023/0056783 A1* | 2/2023 | Kofman | G06F 21/64 |

OTHER PUBLICATIONS

Amazon Web Services, "Amazon Elastic Compute Cloud; User Guide for Linux Instances," available at https://docs.aws.amazon.com/pdfs/AWSEC2/latest/UserGuide/ec2-ug.pdf (visited Jul. 27, 2023).

* cited by examiner

*Primary Examiner* — Peng Ke

(57) ABSTRACT

A system described herein may identify a first container of a virtualized environment, where the first container implements a particular node of a set of nodes that maintain a distributed ledger. Identifying the first container may include identifying a set of node configuration parameters associated with the particular node implemented by the first container, and a set of container configuration parameters associated with the first container. The system may request instantiation of a second container, where configuration parameters of the second container may be based on the container configuration parameters associated with the first container. The system may modify a network interface of the virtualized environment, which is associated with the first container, to be associated with the second container in lieu of the first container. The second container may communicate with the other nodes via the network interface to maintain the distributed ledger.

20 Claims, 8 Drawing Sheets

SYSTEMS AND METHODS FOR SEAMLESS MIGRATION OF DISTRIBUTED LEDGER NODES IN A VIRTUALIZED ENVIRONMENT

BACKGROUND

Distributed ledgers, such as blockchains, provide for the decentralized and secure storage of data. Distributed ledgers may further provide for the immutability of recorded data, as data may not be altered once recorded to a distributed ledger. Distributed ledgers may be maintained by multiple nodes, such as geographically distributed or otherwise distinct servers, workstations, etc., that each maintain local copies of respective distributed ledgers. Nodes may be implemented, for example, by cloud computing systems, virtual machines, or the like.

DETAILED DESCRIPTION OF EXAMPLE EMBODIMENTS

The following detailed description refers to the accompanying drawings. The same reference numbers in different drawings may identify the same or similar elements.

Figure 1:
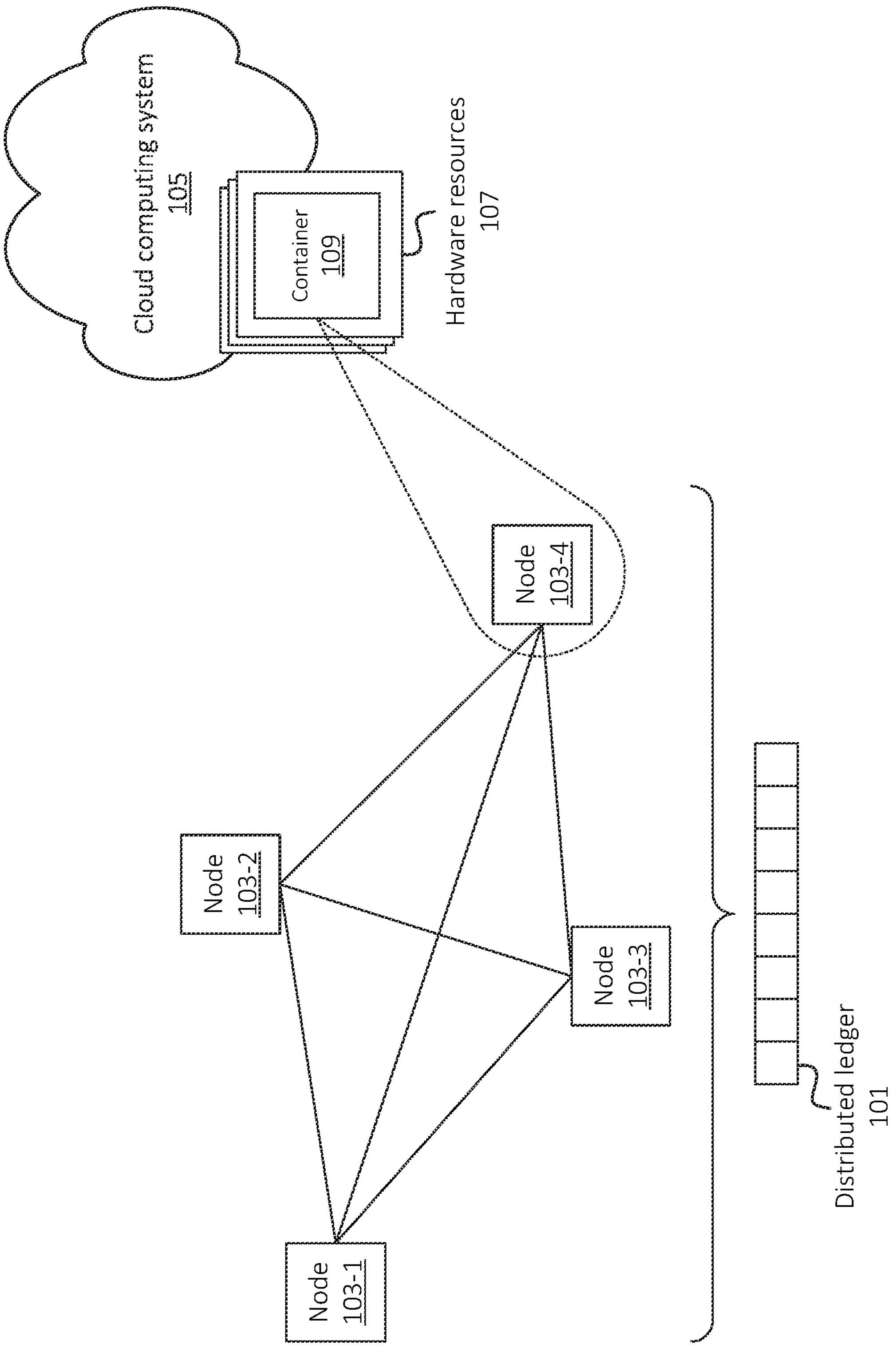
FIGS. 1 and 2 illustrate an example overview of one or more embodiments described herein.

Distributed ledgers may be maintained by multiple nodes, such as geographically distributed or otherwise distinct servers, workstations, etc., that each maintain local copies of respective distributed ledgers. For example, as shown in FIG. 1, a particular distributed ledger 101 may be established and/or maintained by a set of nodes 103 (i.e., nodes 103-1, 103-2, 103-3, and 103-4, in this example). In some embodiments, one or more nodes 103 may each be implemented by a server, a workstation, or other type of "bare metal" device. In some embodiments, one or more nodes 103, may be implemented in a containerized environment, in which various containers, cloud systems, and/or other virtualized environments may implement one or more nodes 103. In the example of FIG. 1, for instance, node 103-4 may be implemented by cloud computing system 105, which may implement the open source Kubernetes system or some other suitable containerization and/or virtualization system. For example, cloud computing system 105 may include a set of hardware resources 107, on which one or more containers 109 may be provisioned, instantiated, etc. Container 109 may be installed on, or may represent, a virtual machine that is implemented by hardware resources 107, and may include one or more images, applications, libraries, etc. that implement the functionality of node 103-4. As discussed below, such functionality may include maintaining a local copy of distributed ledger 101, communicating with other nodes 103 to participate in consensus mechanisms with respect to distributed ledger 101, etc.

In some situations, it may be necessary or otherwise desirable to migrate node 103-4 from container 109 to another container. For example, cloud computing system 105 may perform maintenance or upgrades of hardware resources 107, may require that an operating system installed on container 109 be upgraded (e.g., to a latest version), or may otherwise indicate that node 103-4 should be migrated from container 109 to another container. As another example, an administrator or operator associated with node 103-4 may request a hardware resource configuration modification for container 109, such as an increase or decrease in the amount of hardware resources 107 used to implement container 109, where such modification requires container 109 to be migrated to another container.

Figure 2:
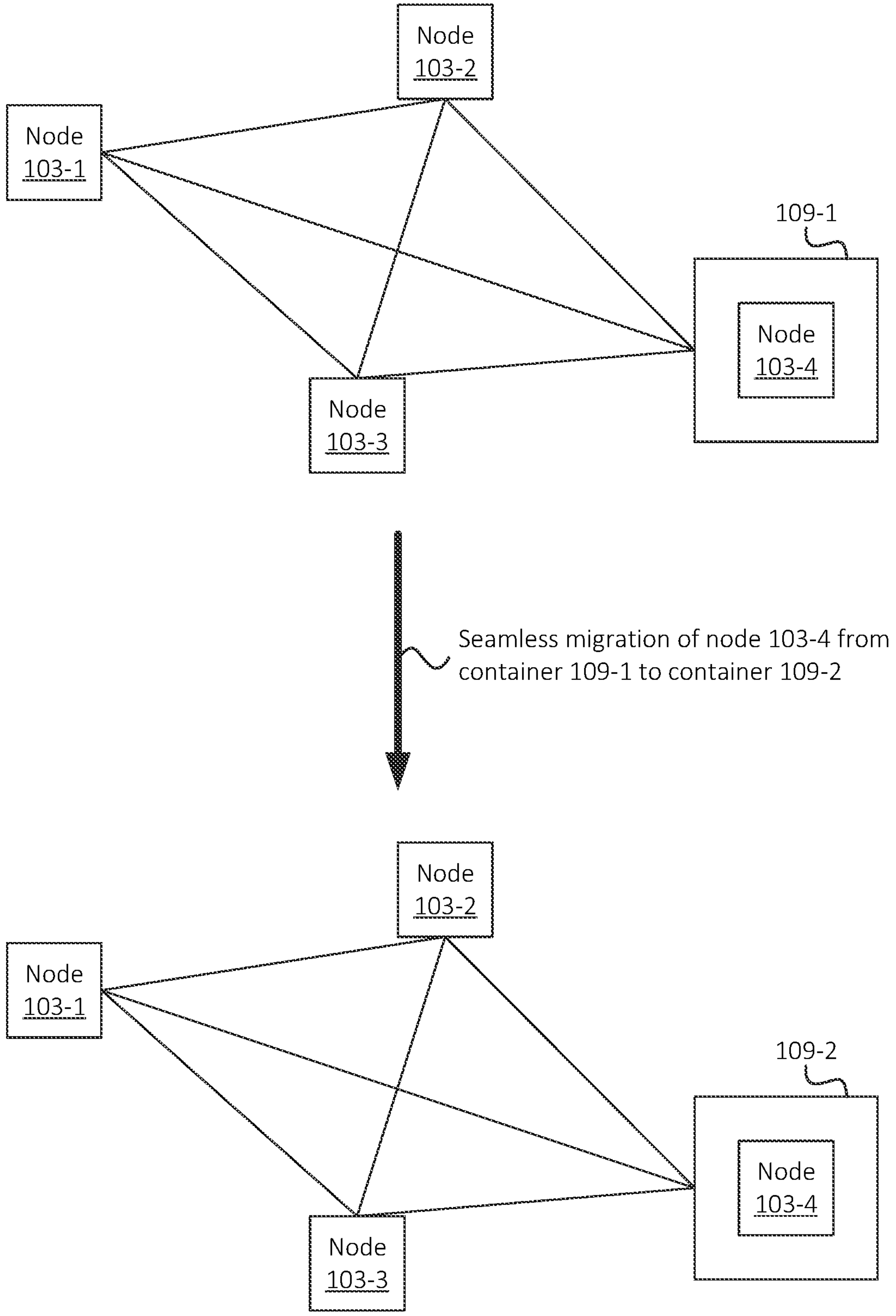

As shown in FIG. 2, embodiments described herein provide for the seamless migration of a node associated with a distributed ledger (e.g., node 103-4 associated with distributed ledger 101, in this example) from a first container of a containerized and/or virtualized environment (e.g., container 109-1 of cloud computing system 105), to a second container of the containerized and/or virtualized environment (e.g., container 109-2 of cloud computing system 105). The migration may be seamless inasmuch as other nodes associated with the distributed ledger (e.g., nodes 103-1 through 103-3, in this example) need not be notified that node 103-4 has been migrated from one container to another. For example, container 109-2 may utilize the same addressing information (e.g., the same Internet Protocol ("IP") address) that nodes 103-1 through 103-3 use to communicate with node 103-4 (e.g., container 109-1). Further, the migration of some embodiments may be seamless inasmuch as the switch from container 109-1 to container 109-2 may be instantaneous, or near-instantaneous, such that no data loss or synchronization issues occur with respect to distributed ledger 101.

Figure 3:
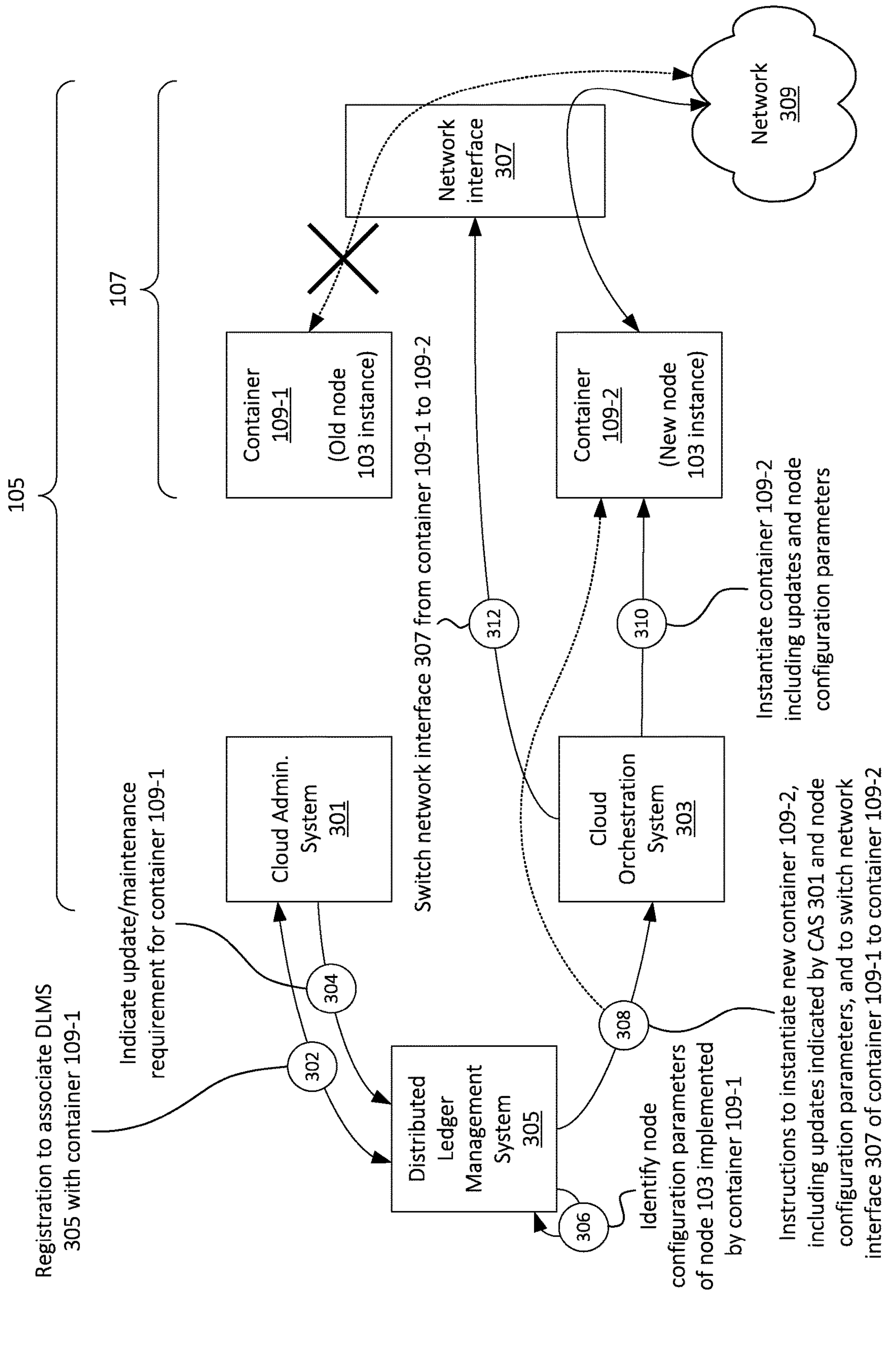
FIG. 3 illustrates example operations associated with migrating a node associated with a distributed ledger from one container of a cloud computing system to another container of the cloud computing system, in accordance with some embodiments.

FIG. 3 illustrates an example migration of a particular node 103, associated with distributed ledger 101 (e.g., which may include node 103-4 mentioned above), from one container to another (e.g., from container 109-1 to container 109-2). As shown, cloud computing system 105 may include Cloud Administration System ("CAS") 301 and Cloud Orchestration System ("COS") 303. Although described as separate systems, CAS 301 and COS 303 may, in some embodiments, be implemented by or associated with the same system. Additionally, or alternatively, the functionality of CAS 301 and/or COS 303 may be implemented by one or more additional devices or systems.

CAS 301 may determine or maintain lifecycle policies, security policies, system update policies, or types of policies or rules with respect to containers implemented by hardware resources 107. For example, CAS 301 may receive periodic or intermittent status or configuration updates from COS 303, which may provision, configure, monitor, etc. containers on hardware resources 107. CAS 301 may maintain information associating particular users, devices, entities, etc. that are associated with particular containers that are installed on hardware resources 107. For example, as shown, CAS 301 may receive (at 302) an indication that a particular container 109-1, which is installed on hardware resources 107, is associated with Distributed Ledger Management System ("DLMS") 305. In some embodiments, DLMS 305 may be associated with a distributed ledger framework such as a Hyperledger® Fabric framework, a ConsenSys Software Inc.® Quorum® framework, an R3® Corda® framework, etc. DLMS 305 may, for example, establish communications between respective nodes 103 that implement or maintain such distributed ledgers 101, assign roles to particular nodes 103 (e.g., ordering node, peer, etc.), manage access to respective distributed ledgers 101 (e.g., where one or more of such distributed ledgers 101 may be "private" or "permissioned" distributed ledgers), serve as an interface between distributed ledgers 101 and clients or other external devices, or perform other suitable operations.

DLMS 305 may have, for example, previously instructed COS 303 to instantiate container 109-1, which may have included providing hardware configuration parameters or requirements (e.g., storage resource parameters, processor parameters, memory parameters, etc.), one or more images or applications associated with implementing node 103, one or more operating systems or system libraries, or the like. In some embodiments, DLMS 305 may have configured container 109-1 by providing one or more certificates, authentication keys, or other suitable authentication mechanisms indicating that container 109-1 is securely implementing node 103, network information (e.g., IP addresses) of other nodes 103 that maintain the same distributed ledger 101, or other suitable configuration information. In some embodiments, container 109-1 may have been configured (e.g., by DLMS 305) to communicate with other nodes 103 via network 309, using network interface 307 of hardware resources 107.

Network interface 307 may include, in some embodiments, a configurable or switchable network interface, such as an Elastic Network Interface ("ENI") that is provided or managed by COS 303. Network interface 307 may include or may be communicatively coupled to one or more virtual network interfaces with which containers implemented by hardware resources 107 (e.g., as instantiated or managed by COS 303), such as container 109-1, may send or receive traffic to other devices, systems, or networks. For example, as shown, containers implemented by hardware resources 107, such as container 109-1, may communicate with network 309 via network interface 307. Network 309 may include, for example, a Local Area Network ("LAN"), a wide area network ("WAN"), the Internet, and/or some other type of network. Network interface 307 may include or may be communicatively coupled to one or more physical network interfaces, such as an Ethernet card, a Network Interface Card ("NIC"), or the like, that are included in hardware resources 107.

The registration (at 302) of DLMS 305 with container 109-1 may be performed in conjunction with, or as part of, the instantiation of container 109-1 on hardware resources 107. Additionally, or alternatively, DLMS 305 may register as being associated with container 109-1 at some point after the instantiation of container 109-1.

CAS 301 may, at some point, determine that container 109-1 should be updated or maintained. For example, CAS 301 may maintain lifecycle policies, security policies, etc. based on which CAS 301 may determine that container 109-1 should be updated or maintained. For example, CAS 301 may determine that a threshold duration of time has passed since an operating system, libraries, etc. installed on container 109-1 have been updated. As another example, CAS 301 may receive a notification that an operating system, set of libraries, etc. installed on container 109-1 have been updated. In some embodiments, the update or maintenance determined by CAS 301 may be in accordance with a "rehydration" schedule or cycle. In some embodiments, CAS 301 may communicate with COS 303 to determine which version of operating system, libraries, etc. are installed on container 109-1, based on which CAS 301 may determine that such operating system, libraries, etc. is/are out of date or in need of update.

CAS 301 may indicate (at 304) to DLMS 305 that container 109-1 should be updated or otherwise maintained. In some embodiments, CAS 301 may provide one or more images, installation packages, etc. for an operating system, set of libraries, etc. to be installed on container 109-1. Additionally, or alternatively, CAS 301 may indicate a version, provide locator information (e.g., a Uniform Resource Locator ("URL"), a Uniform Resource Identifier ("URI"), etc.), or other suitable information based on which DLMS 305 may retrieve an updated version of the operating system, libraries, etc. to install on container 109-1.

Based on receiving (at 304) the update or maintenance indication from CAS 301, DLMS 305 may identify (at 306) a set of node configuration parameters of the particular node 103 implemented by container 109-1. For example, DLMS 305 may identify one or more images, certificates, etc. that are installed on container 109-1 that are used to implement node 103. As another example, DLMS 305 may identify a local copy of distributed ledger 101 or other information that is maintained by container 109-1. In some embodiments, DLMS 305 may identify address information (e.g., IP addresses) of some or all of the other nodes 103 that maintain distributed ledger 101 in conjunction with the particular node 103 implemented by container 109-1. In some embodiments, DLMS 305 may further identify hardware parameters associated with container 109-1, including an amount of storage resources provisioned for container 109-1, an amount of processing resources provisioned for container 109-1, or the like. In this manner, DLMS 305 may aggregate the node configuration parameters of node 103 implemented by container 109-1, hardware parameters of container 109-1, as well as update or maintenance information for container 109-1 (e.g., an updated operating system, libraries, etc.).

DLMS 305 may instruct (at 308) COS 303 to instantiate a new container 109-2. The instructions may include some or all of the parameters of container 109-1 and of node 103 implemented by container 109-1. For example, DLMS 305 may provide information indicating an amount of storage resources, processor resources, etc. that were associated with container 109-1. Additionally, or alternatively, in situations where DLMS 305 is requesting a different amount of resources for container 109-2, DLMS 305 may indicate the different amount of resources to COS 303. In this manner, node 103 may be able to be implemented, by container 109-2, using virtualized resources of a different amount or type than were used by container 109-1 (e.g., upgraded resources to improve processing power or storage space, or lower resources in situations where container 109-1 was underutilizing resources).

DLMS 305 may additionally provide an operating system, set of libraries, etc. to COS 303 for installation on container 109-2. Additionally, or alternatively, as denoted by the dashed line in FIG. 3, DLMS 305 may communicate directly with container 109-2 to install the operating system, libraries, etc. on container 109-2. For example, after instantiation (at 310) of container 109-2, COS 303 may provide communication information to DLMS 305 via which DLMS 305 may communicate with container 109-2. Such communications may be performed via a private network, an internal network associated with cloud computing system 105, etc. For example, COS 303 or some other suitable element of cloud computing system 105 may provide a routing mechanism via which DLMS 305 may communicate with container 109-2. Additionally, or alternatively, COS 303 may instantiate (at 310) container 109-2 based on information provided (at 308) by DLMS 305, either in a single procedure or in a series of iterative procedures (e.g., first instantiating container 109-2, then installing an operating system, then installing one or more images associated with node 103, etc.).

The operating system, set of libraries, etc. provided (at 308) by DLMS 305 may include or incorporate updates indicated by CAS 301, or may otherwise conform to instructions or requirements provided (at 304). Additionally, or alternatively, the operating system, libraries, etc. provided by DLMS 305 may be the same as were installed on container 109-1, such as in situations where container 109-2 is implemented via different amounts or types of virtualized resources than container 109-1 (e.g., in situations described above including a resource upgrade).

DLMS 305 may also install or provide security certificates, software modules, a local copy of distributed ledger 101 that was previously maintained by container 109-1, node configuration information (e.g., IP addresses of other nodes 103), etc., based on which container 109-2 may assume the operation of node 103. In this sense, container 109-2 may be a new instance of node 103, whereas container 109-1 is an old or previous instance of the same node 103.

Once container 109-2 has been instantiated, including the installation of an updated operating system or other libraries (e.g., in situations where CAS 301 has indicated such a requirement), COS 303 may switch network interface 307 from container 109-1 to container 109-2. In some embodiments, the switching of network interface 307 from container 109-1 to container 109-2 may include performing an ENI swap and/or other suitable operations.

In situations where DLMS 305 communicates with container 109-2 to configure container 109-2 to implement node 103, COS 303 may receive a subsequent instruction or confirmation to perform the switch. Switching (at 312) network interface 307 may include modifying or updating internal routing tables or other suitable configurations of cloud computing system 105 to indicate that traffic, received from network 309 via a particular address (e.g., an external address that is "facing" network 309, such as a particular IP address), should be routed to container 109-2 rather than to container 109-1. Similarly, COS 303 may modify or update such routing tables or configurations of cloud computing system 105 to indicate that outbound traffic received from container 109-2 should be output via network interface 307. In some embodiments, performing the switch may further include indicating that any outbound traffic, received from container 109-1, should be rejected (e.g., not allowed to be output via network interface 307, or not allowed to be output via network interface 307 using the IP address that has now been assigned to container 109-2), and further that traffic received via network interface 307 with the particular IP address should not be provided to container 109-1. In this manner, from the standpoint of network 309 and/or of devices that communicate with container 109-2 via network 309 (e.g., other nodes 103), there may be no service interruption or downtime, thus minimizing or eliminating the risk of a desynchronization or lack of quorum for consensus mechanisms associated with distributed ledger 101.

Figure 4A:
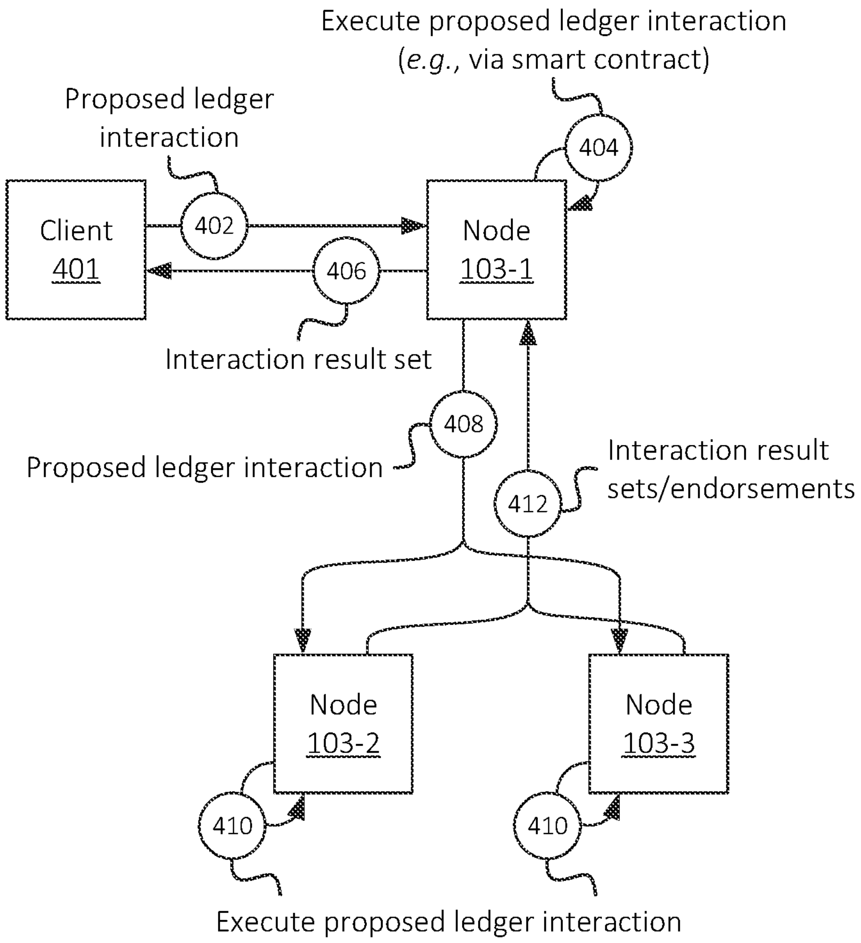
FIGS. 4A and 4B illustrate example operations associated with recording information to a distributed ledger, in accordance with some embodiments.
Figure 4B:
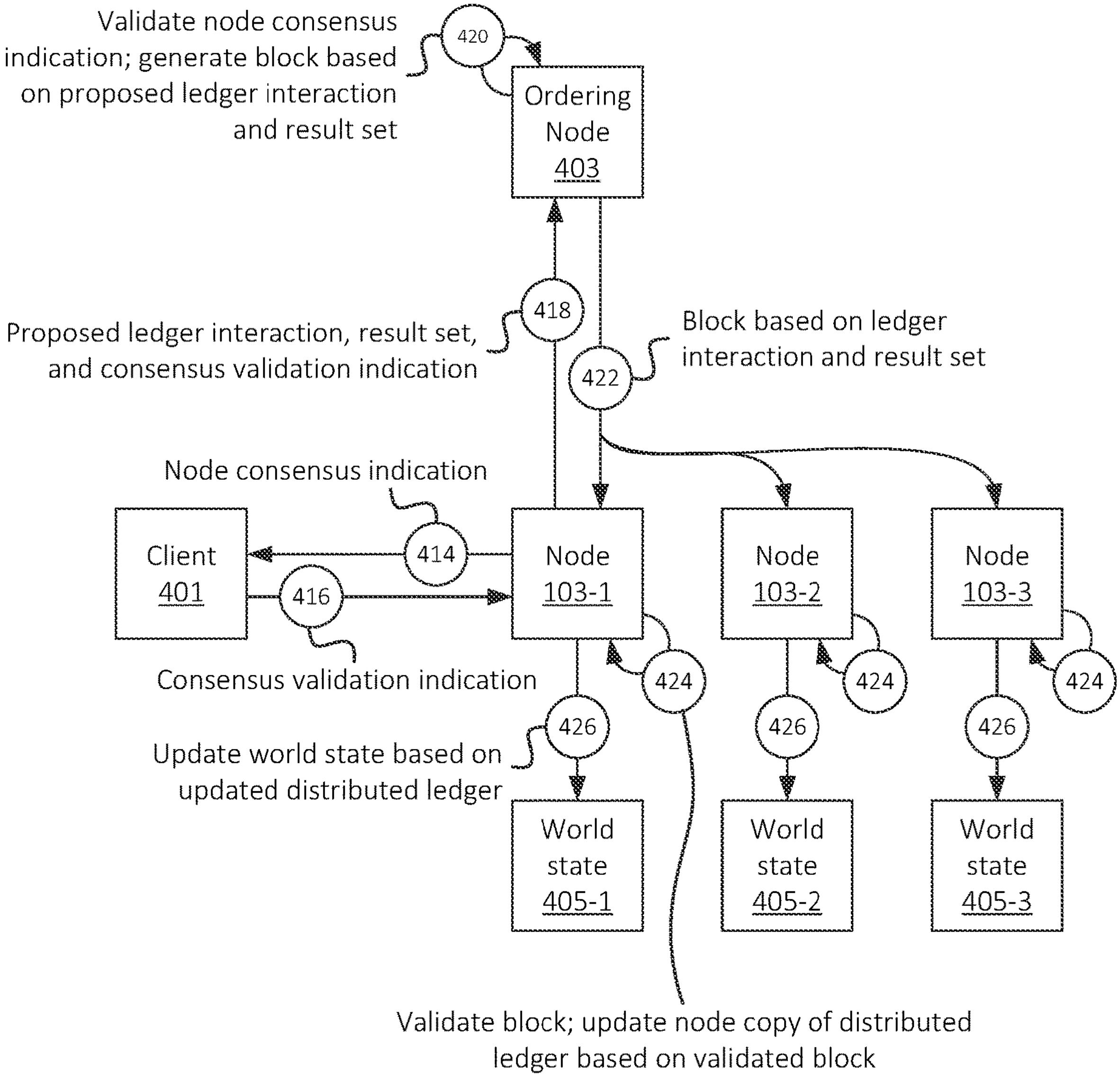

FIGS. 4A and 4B illustrate an example of modifying distributed ledger 101 and/or world state information based on an interaction with distributed ledger 101. As shown, a particular node 103-1 may receive (at 402) a proposed ledger interaction (e.g., a request to access or record information to distributed ledger 101) from a particular source, such as client 401 (e.g., which may be implemented by a device or system that has access to node 103-1, such as a device or system that has authentication credentials, locator information, etc. via which client 401 is able to interact with node 103-1). In some embodiments, node 103-1 may receive the proposed ledger interaction from a distributed ledger management system (e.g., which may receive the proposed ledger interaction from client 401 and may select node 103-1 out of a group of nodes 103, such as a group of nodes associated with the same channel in a channel-based ledger system, such as the Hyperledger® Fabric), an ordering node, or other suitable device or system.

Client 401 may be, for example, an entity associated with distributed ledger 101 (e.g., may be associated with an address, a "wallet," a decentralized application ("dApp"), etc.). In this example, assume that client 401 is authorized to initiate, request, etc. the proposed ledger interaction, which may include the modification of one or more values of one or more attributes that are currently associated with distributed ledger 101, the addition of one or more attributes to distributed ledger 101, or other suitable interactions. In other examples, node 103-1 and/or some other device or system may verify that client 401 is authorized to initiate the proposed ledger interaction. The proposed ledger interactions may be specified in one or more smart contracts, as specified by access parameters associated with distributed ledger 101.

In some embodiments, the proposed ledger interaction (received at 402) may indicate a smart contract recorded to distributed ledger 101, which may specify one or more inputs (e.g., types of inputs, quantity of inputs, and/or other input parameters), and may also include actions to take with respect to the inputs in order to generate one or more outputs (e.g., chaincode). For example, the proposed ledger interaction may specify a particular smart contract (e.g., an address associated with distributed ledger 101 with which the smart contract is associated) and one or more input values according to input parameters specified by the particular smart contract. In some examples, the proposed ledger interaction may refer to one or more values that have previously been recorded to distributed ledger 101 (and thus reflected in world state information associated with distributed ledger 101), such as an interaction that increments or decrements previously recorded values or performs other computations based on previously recorded values.

Node 103-1 may execute (at 404) the proposed ledger interaction, which may include accessing the one or more values that were previously recorded to distributed ledger 101. In order to determine the one or more values referred to in the proposed ledger interaction, node 103-1 may access world state information, maintained by node 103-1, to determine such values. Such access may include checking a local cache and/or accessing, via a network, a remote system (e.g., a "cloud" system, a containerized system, etc.) associated with node 103-1 that maintains the world state associated with distributed ledger 101. The execution (at 404) may be a "simulation" of the proposed ledger interaction, inasmuch as the execution of the proposed ledger interaction and the ensuing result may not yet be recorded to distributed ledger 101. The interaction may become "final" or "committed" based on validation by one or more other nodes. The result may include a "read-write set," which may include the values of the one or more attributes that were accessed (e.g., the values based on which the interaction was performed), as well as the resulting values after execution of the proposed interaction.

Node 103-1 may provide (at 406) the result set (e.g., the read-write set) based on executing (at 404) the proposed interaction to client 401. Client 401 may maintain the result set to, for example, verify and/or to provide approval of the result set before the result set is committed to distributed ledger 101. Node 103-1 may also provide (at 408) the proposed ledger interaction to one or more other nodes 103 associated with distributed ledger 101, such as nodes 103-2 and 103-3. In some embodiments, node 103-1 may provide (at 408) the result set generated by node 103-1 to nodes 103-2 and 103-3. Nodes 103-1 through 103-3 may all be associated with the same channel, nodes 103-2 and 103-3 may be specified by the smart contract as validators, and/or nodes 103-2 and 103-3 may otherwise be identified by node 103-1 or an associated distributed ledger management system as nodes that should validate, endorse, etc. the execution and result of the proposed interaction.

As similarly discussed with respect to node 103-1, nodes 103-2 and 103-3 may execute (at 410), and/or simulate the execution of, the proposed interaction. Accordingly, nodes 103-2 and 103-3 may access one or more values that were previously recorded to distributed ledger 101 using world state information maintained by nodes 103-2 and 103-3. Nodes 103-2 and 103-3 may validate, verify, etc. the result set generated by node 103-1 by comparing the result set with respective result sets generated by nodes 103-2 and 103-3. Nodes 103-2 and 103-3 may respond (at 412) to node 103-1 with respective result sets generated by nodes 103-2 and 103-3, and/or may respond with an indication, endorsement, etc. (e.g., which may be respectively signed by nodes 103-2 and 103-3) that the result set generated by node 103-1 is valid. Once node 103-1 has received endorsements from at least a threshold quantity of other nodes (e.g., from nodes 103-2 and 103-3, in this example), node 103-1 may determine that a consensus has been reached with respect to the result set for the proposed interaction.

As shown in FIG. 4B, node 103-1 may accordingly provide (at 414), to client 401, an indication that consensus for the result set (provided at 406) has been reached. In some embodiments, client 401 may validate the consensus (e.g., by evaluating signatures of nodes 103-2 and 103-3) and/or may verify the result set (e.g., by itself executing the proposed interaction). Client 401 may provide (at 416), to node 103-1, an indication that client 401 has validated the consensus and/or has verified the result set. In some embodiments, the consensus validation indication may be signed by client 401, thus securely authenticating the validation by client 401.

Node 103-1 may provide (at 418) the result set, along with the consensus validation indication and the proposed ledger interaction, to ordering node 403. Ordering node 403 may be a node, associated with the same channel as nodes 103-1 through 103-3, that validates (at 420) the consensus validation indication (e.g., validates signatures associated with client 401 and/or nodes 103-1 through 103-3) and generates a block, to be recorded to distributed ledger 101, that includes information regarding the ledger interaction. Such information may include an identifier of client 401 (e.g., an address, wallet identifier, etc.), identifiers of nodes 103-1 through 103-3 that participated in generating and/or validating the result set based on the ledger interaction, smart contract inputs provided by client 401, the consensus validation indication, one or more timestamps of the above operations and/or other events, and/or other suitable information associated with the ledger interaction. In some embodiments, the block may be signed by ordering node 403, thus securely authenticating the block creation by ordering node 403. At this point, the ledger interaction may no longer be a "proposed" ledger interaction, as the interaction has been finalized, committed, etc. by ordering node 403. In some implementations, nodes 103-1 through 103-3 may be referred to as "peers," to indicate that such nodes 103-1 through 103-3 are distinct from ordering node 403 (e.g., ordering node 403 performs one or more different operations from the peers).

Ordering node 403 may propagate (at 422) the signed block, including information regarding the finalized ledger interaction initiated by client 401, to nodes 103-1 through 103-3 and/or other nodes associated with the same channel. Nodes 103-1 through 103-3 may validate (at 424) the block, which may include verifying the signature of ordering node 403, and may accordingly update a respective copy of distributed ledger 101 as maintained by each one of nodes 103-1 through 103-3. Nodes 103-1 through 103-3 may maintain respective independent copies of distributed ledger 101, thus providing an element of decentralization to distributed ledger 101. As such, when adding the block (received at 422), nodes 103-1 through 103-3 may continue to maintain separate copies of the same distributed ledger 101, including the information regarding the finalized ledger interaction.

Nodes 103-1 through 103-3 may also maintain respective world state information 405 (e.g., world state information 405-1 through 405-3). For example, world state information 405 may include a portion of the information stored in distributed ledger 101, such as the latest version of some or all of the attributes for which information has been recorded to distributed ledger 101. Nodes 103-1 through 103-3 may accordingly update (at 426) respective copies of world state information 405 based on the received block. For example, in the event that the block includes a change in the value of a particular attribute, nodes 103-1 through 103-3 may update world state information 405-1 through 405-3, respectively, to replace a previous value of the attribute (e.g., a previous version of the attribute) with the newly received value of the particular attribute.

Figure 5:
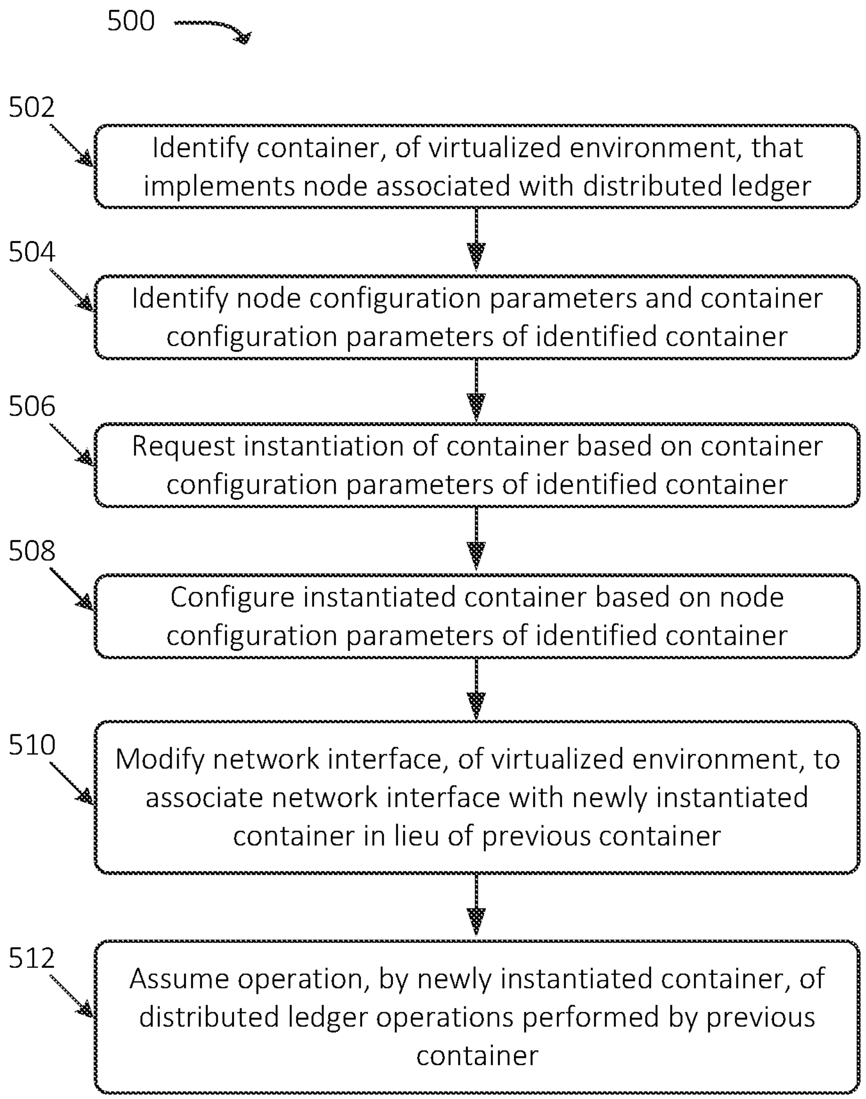
FIG. 5 illustrates an example process for migrating a node associated with a distributed ledger from one container of a cloud computing system to another container of the cloud computing system, in accordance with some embodiments.

FIG. 5 illustrates an example process 500 for migrating a node associated with a distributed ledger from one container of a cloud computing system to another container of the cloud computing system. In some embodiments, some or all of process 500 may be performed by DLMS 305. In some embodiments, one or more other devices may perform some or all of process 500 in concert with, and/or in lieu of, DLMS 305.

As shown, process 500 may include identifying (at 502) a particular container of a virtualized environment (e.g., cloud computing system 105) that implements a particular node associated with a distributed ledger. For example, as discussed above, DLMS 305 may identify a particular container 109-1 that implements a particular node 103 that maintains a local copy of distributed ledger 101. As similarly discussed above, container 109-1 (e.g., node 103 implemented by container 109-1) may communicate, via network interface 307, with one or more other nodes 103 to perform operations related to maintaining distributed ledger 101, such as participating in consensus mechanisms to securely add information to distributed ledger 101, providing access to information recorded to distributed ledger 101, etc. In some embodiments, DLMS 305 may identify (at 502) container 109-1 and/or perform other operations described below based on receiving a request from the virtualized environment, such as from CAS 301, to modify parameters of container 109-1, such as upgrading an operating system version, replacing an operating system installed on container 109-1 with another operating system, restarting or rehydrating container 109-1, etc.

Process 500 may further include identifying (at 504) node configuration parameters and container configuration parameters of the identified container. For example, DLMS 305 may identify node configuration parameters such as IP addresses or other identifiers associated with other nodes 103 that maintain distributed ledger 101, roles of node 103 (e.g., ordering node 403, peer, etc.), certificates or other authentication information of node 103, a local copy of distributed ledger 101 maintained by node 103, one or more images or modules installed on container 109-1 that are executable to perform operations of node 103, etc. Further, DLMS 305 may identify container configuration parameters such as a namespace or identifier of container 109-1, resource parameters (e.g., storage resource parameters, processor resource parameters, memory resource parameters, etc.), an operating system or libraries installed on container 109-1, etc.

Process 500 may additionally include requesting (at 506) instantiation of another container based on the container configuration parameters of the identified container. For example, DLMS 305 may request (e.g., to CAS 301, COS 303, or some other suitable device or system of cloud computing system 105) that a new container be provisioned (e.g., container 109-2). DLMS 305 may request that the same container configuration parameters of container 109-1 be used for container 109-2, such as the same resource parameters, the same operating system or other libraries, etc. In some scenarios, DLMS 305 may request one or more different container configuration parameters, such as a different operating system or different operating system version, an upgraded set of resources, etc. For example, as discussed above, the different container configuration parameters may be based on a requirement or request from CAS 301 (e.g., an indication that an operating system should be upgraded or changed) or based on some other suitable determination (e.g., a determination by DLMS 305 that additional or fewer hardware resources should be used to implement node 103).

Process 500 may also include configuring (at 508) the instantiated container based on the node configuration parameters of the identified container. For example, DLMS 305 may import or otherwise configure the node configuration parameters, of node 103 as implemented by container 109-1, to container 109-2. Such configuring may include installing the same images or modules that are executable to implement node 103, installing updated images or modules that are executable to implement node 103 (e.g., an updated version), installing the certificates that were used by container 109-1, installing the local copy of distributed ledger 101 used by container 109-1, providing IP addresses of the other nodes 103 associated with distributed ledger 101, etc.

Process 500 may further include modifying (at 510) a network interface, of the virtualized environment, to associate the network interface with the newly instantiated container in lieu of the previous container. For example, DLMS 305 may request that network interface 307, which was previously used to route traffic between container 109-1 and network 309, be switched to now route traffic between container 109-2 and network 309. Network interface 307 may include, for example, an ENI or other suitable networking or routing mechanism that maintains the same external address (e.g., the same external IP address) used to communicate with other devices or systems via network 309, but for which internal routing is modifiable.

Process 500 may additionally include assuming (at 512) operation, by the newly instantiated container, of distributed ledger operations performed by the previous container. For example, once network interface 307 has been switched to be associated with container 109-2 in lieu of with container 109-1, container 109-2 may be able to communicate with other nodes 103, via network 309, to maintain distributed ledger 101. As discussed above, such operations may include performing consensus mechanisms, providing access to information stored in distributed ledger 101, etc.

Figure 6:
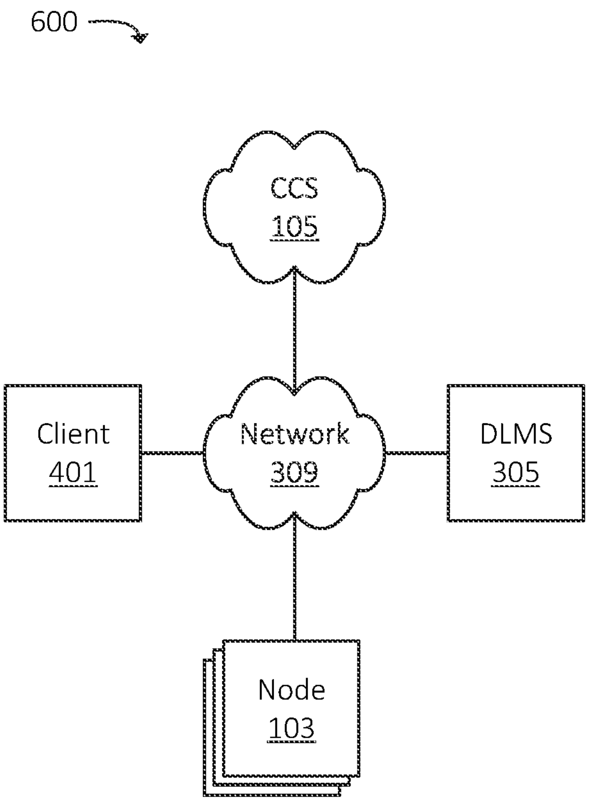
FIG. 6 illustrates example environments in which one or more embodiments, described herein, may be implemented.

FIG. 6 illustrates an example environment 600, in which one or more embodiments may be implemented. Environment 600 may include network 309, client 401, DLMS 305, and nodes 103. In some embodiments, environment 600 may include one or more additional devices or systems communicatively coupled to network 309 and/or one or more other networks.

The quantity of devices and/or networks, illustrated in FIG. 6, is provided for explanatory purposes only. In practice, environment 600 may include additional devices and/or networks, fewer devices and/or networks, different devices and/or networks, or differently arranged devices and/or networks than illustrated in FIG. 6. For example, while not shown, environment 600 may include devices that facilitate or enable communication between various components shown in environment 600, such as routers, modems, gateways, switches, hubs, etc. In some implementations, one or more devices of environment 600 may be physically integrated in, and/or may be physically attached to, one or more other devices of environment 600. Alternatively, or additionally, one or more of the devices of environment 600 may perform one or more network functions described as being performed by another one or more of the devices of environment 600. Elements of environment 600 may interconnect with each other and/or other devices via wired connections, wireless connections, or a combination of wired and wireless connections. Some or all of the elements of environment 600 may be implemented by one or more devices, sets of hardware resources, cloud systems, or the like.

Network 309 may include one or more wired and/or wireless networks. For example, network 309 may include an IP-based Packet Data Network ("PDN"), a WAN such as the Internet, a private enterprise network, and/or one or more other networks. Client 401, DLMS 305, nodes 103, and/or other devices or systems may communicate, through network 309, with each other and/or with other devices that are coupled to network 309. Network 309 may be connected to one or more other networks, such as a public switched telephone network ("PSTN"), a public land mobile network ("PLMN"), and/or another network. Network 309 may be connected to one or more devices, such as content providers, applications, web servers, and/or other devices, with which client 401, DLMS 305, nodes 103, and/or other devices or systems may communicate.

Client 401, DLMS 305, nodes 103, and/or other devices or systems may be implemented by one or more cloud systems (e.g., cloud computing system 105), server devices, or other types of hardware resources. In some embodiments, client 401, DLMS 305, and/or nodes 103 may be implemented by or communicatively coupled to a User Equipment ("UE"), which may include a computation and communication device, such as a wireless mobile communication device that is capable of communicating with network 309. The UE may communicate with network 309 via a wired or a wireless interface, such as via one or more radio access network ("RANs"), such as a Fifth Generation ("5G") RAN, a Long-Term Evolution ("LTE") RAN, etc. The UE may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, a wearable device, a Machine-to-Machine ("M2M") device, or the like), a Fixed Wireless Access ("FWA") device, or another type of mobile computation and communication device.

Figure 7:
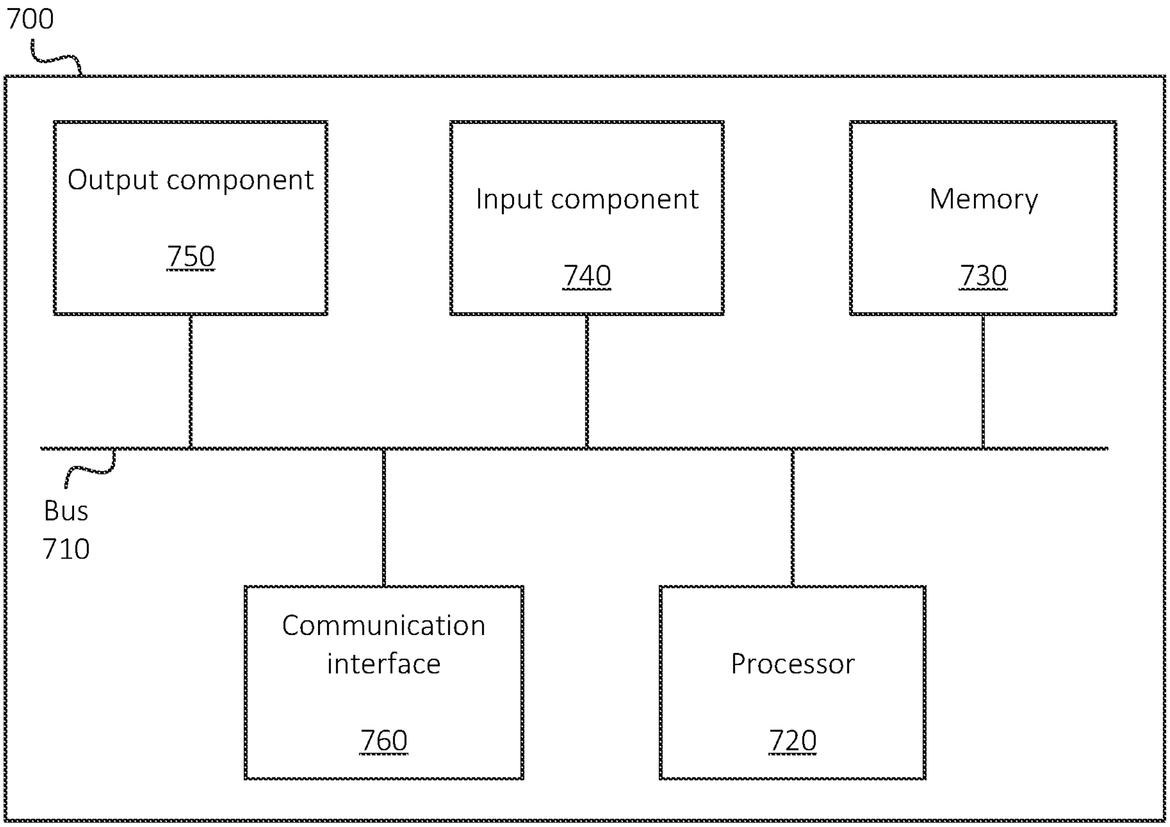
FIG. 7 illustrates example components of one or more devices, in accordance with one or more embodiments described herein.

FIG. 7 illustrates example components of device 700. One or more of the devices described above may include one or more devices 700. Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions (e.g., processor-executable instructions). In some embodiments, processor 720 may be or may include one or more hardware processors. Memory 730 may include any type of dynamic storage device that may store information and instructions for execution by processor 720, and/or any type of non-volatile storage device that may store information for use by processor 720.

Input component 740 may include a mechanism that permits an operator to input information to device 700 and/or otherwise receives or detects input from a source external to input component 740, such as a touchpad, a touchscreen, a keyboard, a keypad, a button, a switch, a microphone or other audio input component, etc. In some embodiments, input component 740 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing instructions, such as software instructions, processor-executable instructions, etc. stored in a computer-readable medium, such as memory 730. A computer-readable medium may be defined as a non-transitory memory device. A memory device may include space within a single physical memory device or spread across multiple physical memory devices. The instructions may be read into memory 730 from another computer-readable medium or from another device. The instructions stored in memory 730 may be processor-executable instructions that cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-5), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:

one or more processors configured to:

identify a first container of a virtualized environment, wherein the first container implements a particular node of a plurality of nodes that maintain a distributed ledger, wherein identifying the first container includes identifying:

a set of node configuration parameters associated with the particular node implemented by the first container, and a set of container configuration parameters associated with the first container;

implement a network interface of the virtualized environment, wherein implementing the network interface of the virtualized environment includes routing first traffic, received via the network interface, to the first container;

request instantiation of a second container of the virtualized environment, wherein one or more configuration parameters of the second container are based on the set of container configuration parameters associated with the first container;

configure the second container based on the set of node configuration parameters; and modify, based on configuring the second container, the network interface of the virtualized environment to be associated with the second container in lieu of the first container, wherein the second container communicates with one or more of the other nodes of the plurality of nodes via the modified network interface to maintain the distributed ledger, wherein implementing the modified network interface includes second routing traffic, received via the modified network interface after modification of the network interface, to the second container in lieu of the first container.

2. The device of claim 1, wherein the network interface is associated with a particular external Internet Protocol ("IP") address when associated with the first container, wherein the network interface continues to be associated with the same particular external IP address after being associated with the second container.

3. The device of claim 1, wherein the network interface includes an Elastic Network Interface ("ENI").

4. The device of claim 1, wherein the set of node configuration parameters include IP addresses of the one or more other nodes of the plurality of nodes.

5. The device of claim 1, wherein the container configuration parameters include at least one of:

a storage resource parameter, a processor resource parameter, or a memory resource parameter.

6. The device of claim 1, wherein the first container includes a first operating system, and wherein the second container includes a second operating system, wherein requesting instantiation of the second container is based on receiving an indication, from the virtualized environment, that the first operating system should be replaced with the second operating system.

7. A non-transitory computer-readable medium, storing a plurality of processor-executable instructions to:

identify a first container of a virtualized environment, wherein the first container implements a particular node of a plurality of nodes that maintain a distributed ledger, wherein identifying the first container includes identifying:

a set of node configuration parameters associated with the particular node implemented by the first container, and a set of container configuration parameters associated with the first container;

implement a network interface of the virtualized environment, wherein implementing the network interface of the virtualized environment includes routing first traffic, received via the network interface, to the first container;

request instantiation of a second container of the virtualized environment, wherein one or more configuration parameters of the second container are based on the set of container configuration parameters associated with the first container;

configure the second container based on the set of node configuration parameters; and modify, based on configuring the second container, the network interface of the virtualized environment to be associated with the second container in lieu of the first container, wherein the second container communicates with one or more of the other nodes of the plurality of nodes via the modified network interface to maintain the distributed ledger, wherein implementing the modified network interface includes second routing traffic, received via the modified network interface after modification of the network interface, to the second container in lieu of the first container.

8. The non-transitory computer-readable medium of claim 7, wherein the network interface is associated with a particular external Internet Protocol ("IP") address when associated with the first container, wherein the network interface continues to be associated with the same particular external IP address after being associated with the second container.

9. The non-transitory computer-readable medium of claim 7, wherein the network interface includes an Elastic Network Interface ("ENI").

10. The non-transitory computer-readable medium of claim 7, wherein the set of node configuration parameters include IP addresses of the one or more other nodes of the plurality of nodes.

11. The non-transitory computer-readable medium of claim 7, wherein the container configuration parameters include at least one of:

a storage resource parameter, a processor resource parameter, or a memory resource parameter.

12. The non-transitory computer-readable medium of claim 7, wherein the first container includes a first operating system, and wherein the second container includes a second operating system, wherein requesting instantiation of the second container is based on receiving an indication, from the virtualized environment, that the first operating system should be replaced with the second operating system.

13. A method, comprising:

identifying a first container of a virtualized environment, wherein the first container implements a particular node of a plurality of nodes that maintain a distributed ledger, wherein identifying the first container includes identifying:

a set of node configuration parameters associated with the particular node implemented by the first container, and a set of container configuration parameters associated with the first container;

implementing a network interface of the virtualized environment, wherein implementing the network interface of the virtualized environment includes routing first traffic, received via the network interface, to the first container;

requesting instantiation of a second container of the virtualized environment, wherein one or more configuration parameters of the second container are based on the set of container configuration parameters associated with the first container;

configuring the second container based on the set of node configuration parameters; and modify, based on configuring the second container, the network interface of the virtualized environment to be associated with the second container in lieu of the first container, wherein the second container communicates with one or more of the other nodes of the plurality of nodes via the modified network interface to maintain the distributed ledger, wherein implementing the modified network interface includes second routing traffic, received via the modified network interface after modification of the network interface, to the second container in lieu of the first container.

14. The method of claim 13, wherein the network interface is associated with a particular external Internet Protocol ("IP") address when associated with the first container, wherein the network interface continues to be associated with the same particular external IP address after being associated with the second container.

15. The method of claim 13, wherein the network interface includes an Elastic Network Interface ("ENI").

16. The method of claim 13, wherein the set of node configuration parameters include IP addresses of the one or more other nodes of the plurality of nodes.

17. The method of claim 13, wherein the container configuration parameters include at least one of:

a storage resource parameter, a processor resource parameter, or a memory resource parameter.

18. The method of claim 13, wherein requesting instantiation of the second container is based on receiving an indication, from the virtualized environment, that a first operating system installed at the first container should be replaced with a second operating system.

19. The method of claim 14, wherein the particular node is a first node of the plurality of nodes, wherein the first traffic and the second traffic are received from a second node of the plurality of nodes, and wherein the first and second traffic each indicate the particular IP address associated with the network interface.

20. The device of claim 2, wherein the particular node is a first node of the plurality of nodes, wherein the first traffic and the second traffic are received from a second node of the plurality of nodes, and wherein the first and second traffic each indicate the particular IP address associated with the network interface.

* * * * *